United States Patent [19]

Kwon

[11] Patent Number: 5,596,375
[45] Date of Patent: Jan. 21, 1997

[54] AUTOMATIC BRIGHTNESS CONTROL APPARATUS FOR A MONITOR

[75] Inventor: Gi J. Kwon, Kyungsangbuk-Do, Rep. of Korea

[73] Assignee: LG Electronics, Inc., Seoul, Rep. of Korea

[21] Appl. No.: 528,548

[22] Filed: Sep. 15, 1995

[30]     Foreign Application Priority Data

Sep. 16, 1994  [KR]   Rep. of Korea ............... 94-23713

[51] Int. Cl.⁶ ............... H04N 5/228; H04N 5/68
[52] U.S. Cl. ............... 348/687; 348/673; 348/678
[58] Field of Search ................... 348/673, 687, 348/678, 637; H04N 5/228, 5/68

[56]     References Cited

U.S. PATENT DOCUMENTS

| 3,735,029 | 5/1973 | Sunstein | 358/74 |
| 3,873,767 | 3/1975 | Okada et al. | 348/673 |
| 4,947,253 | 8/1990 | Neil | 358/174 |
| 4,982,287 | 1/1991 | Lagoni | 348/687 |

*Primary Examiner*—Glenton B. Burgess
*Attorney, Agent, or Firm*—Fish & Richardson P.C.

[57]     ABSTRACT

Automatic brightness control apparatus for a monitor which can provide a high picture quality by properly adjusting the back raster's brightness in accordance with the picture's brightness produced on a screen. According to the apparatus, the back raster's brightness is lowered in a relatively bright picture state, while it is heightened in a relatively dark picture state.

4 Claims, 3 Drawing Sheets

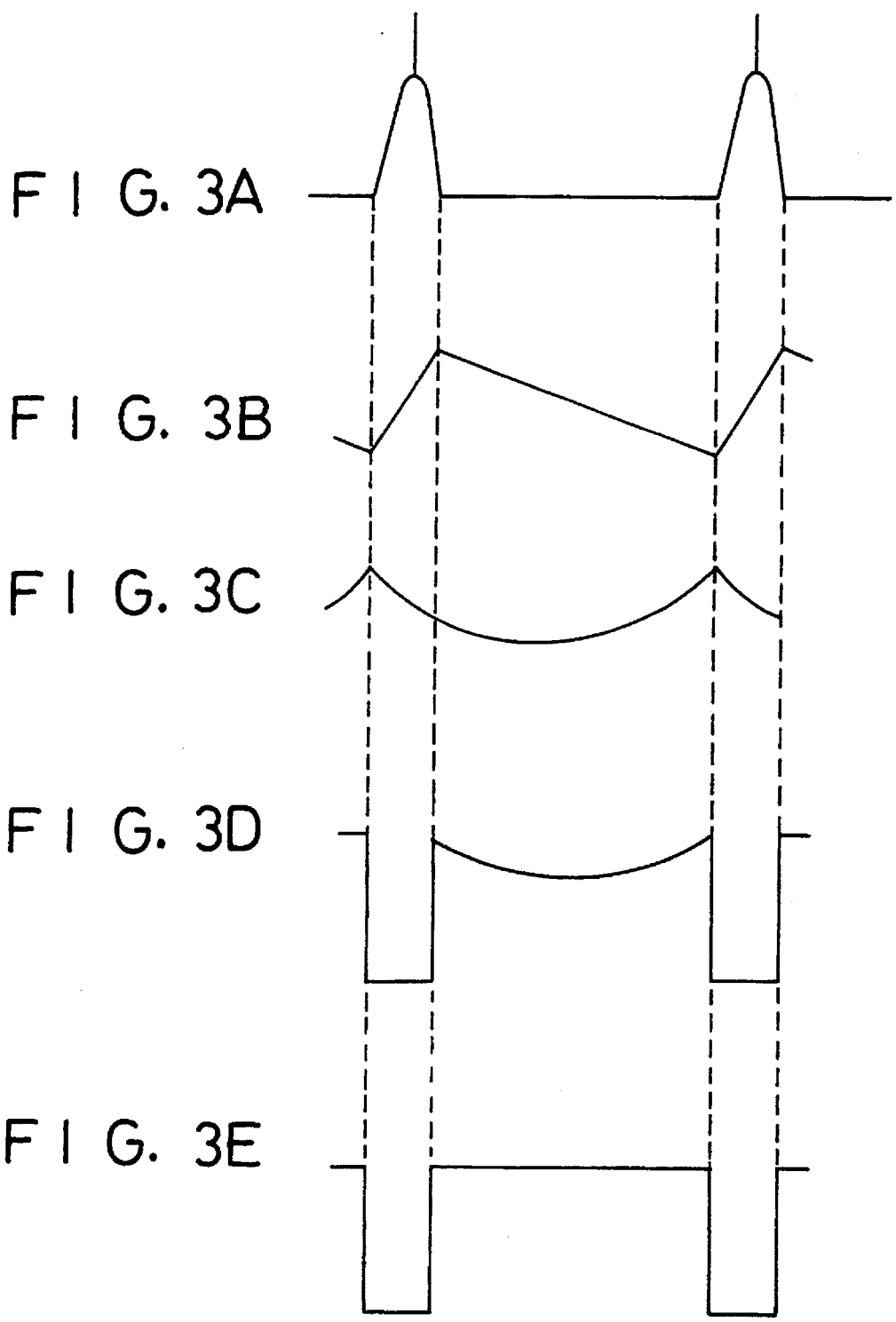

AUTOMATIC BRIGHTNESS CONTROL APPARATUS FOR A MONITOR

BACKGROUND OF THE INVENTION

1. Field of the Invention

The present invention relates to brightness control of a monitor, and more particularly to an automatic brightness control apparatus for a monitor which can provide a high picture quality by automatically adjusting the brightness of a back raster accordance with the brightness of a picture on a screen.

2. Description of the Prior Art

A conventional brightness control apparatus for a monitor, i.e., a cathode-ray tube (CRT) is illustrated in FIG. 1. Referring to FIG. 1, the conventional apparatus is provided with a flyback transformer T1 having one secondary winding for generating a CRT anode voltage and the other secondary winding for generating a CRT grid voltage, a diode D1 for passing negative-going portions of pulses induced in the secondary winding of the flyback transformer T1 for generating the CRT grid voltage, and a capacitor C1 for smoothing the voltage provided through the diode D1.

The conventional apparatus is also provided with a first variable resistor VR1 for adjusting the smoothed voltage to provide the adjusted voltage to a grid terminal G of the CRT, a second variable resistor VR2 for adjusting an input fixed voltage Vo to provide the adjusted input voltage to the grid terminal G of the CRT, and a blanking circuit section 1 for providing blanking pulses to the grid terminal G of the CRT.

In FIG. 1, the numerals C2 and C3 denote capacitors, D2 and B3 denote diodes, and R1 denotes a resistor.

The operation of the conventional brightness control apparatus as constructed above will now be explained.

If the $B^+$ supply voltage is applied to a primary winding of the flyback transformer T1 by switching operation of a transistor Q1, a high voltage is induced in one secondary winding of the flyback transformer T1 for generation the CRT anode voltage, and the induced high voltage is applied to the anode of the CRT.

At the same time, a voltage induced in the other secondary winding of the flyback transformer T1 for generating the CRT grid voltage is supplied to the diode D1, so that the diode D1 passes and provides to the capacitor C1 only negative-going portions of the voltage.

The capacitor C1 smooths the negative-going voltage portions provided from the diode D1 and provides the smoothed DC voltage to the first variable resistor VR1. The negative DC voltage from the first variable resistor VR1 is then supplied to the grid terminal G of the CRT.

The first variable resistor VR1, which is installed outside the monitor, is adjusted by a user's manipulation thereof to vary the voltage level being supplied to the grid terminal G of the CRT.

The second variable resistor VR2, which is installed inside the monitor, is for varying the input fixed voltage Vo to supply the varied input voltage to the grid terminal G of the CRT. The blanking circuit section 1 generates and provides blanking pulses to the grid terminal G of the Crt through the capacitor C2.

Accordingly, the voltages adjusted by the respective variable resistors VR1 and VR2 as well as the blanking pulses are supplied to the grid terminal G of the CRT. Specifically, the adjusted voltages through the variable resistors VR1 and VR2 are for controlling the brightness of the picture produced on the screen, while the blanking pulses are for blanking the retrace lines appearing on the screen during retrace periods.

According to the conventional brightness control apparatus as described above, since the brightness of the back raster on the monitor is fixed constant by the adjustment of the variable resistors, the back raster brightens, causing the picture to become brighter, when a high-leveled beam current flows to the anode A of the CRT to represent a bright image, while the back raster darkens, causing the picture to become darker, when a low-leveled beam current flows.

Further, the conventional apparatus has the drawback that the picture represented at the center portion of the screen becomes brighter than that at the circumferential portion thereof due to the difference in deflection angle between the center and the circumferential portions.

SUMMARY OF THE INVENTION

The present invention has been made to overcome the problems involved in the prior art. It is an object of the present invention to provide an automatic brightness control apparatus for a monitor which can display a clear image by lowering the brightness of the back raster in a relatively bright picture state and by heightening the brightness of the back raster in a relatively dark picture state.

In order to achieve the above object, there is provided an automatic brightness control apparatus for a monitor having an anode and a grid terminal, the apparatus comprising:

means for controlling brightness of said monitor;

means for detecting a beam current flowing to said anode;

control means for controlling a brightness control voltage being supplied to said grid terminal in accordance with said beam current detected by said beam current detecting means; and means for providing said brightness control voltage to said brightness control means under the control of said control means.

BRIEF DESCRIPTION OF THE DRAWINGS

The above object and other features of the present invention will become more apparent by describing the preferred embodiment thereof with reference to the accompanying drawings, in which:

FIGS. 3A to 3E are waveform diagrams illustrating waveforms at various points in FIG. 2.

DETAILED DESCRIPTION OF THE PREFERRED EMBODIMENT

Figure 1:
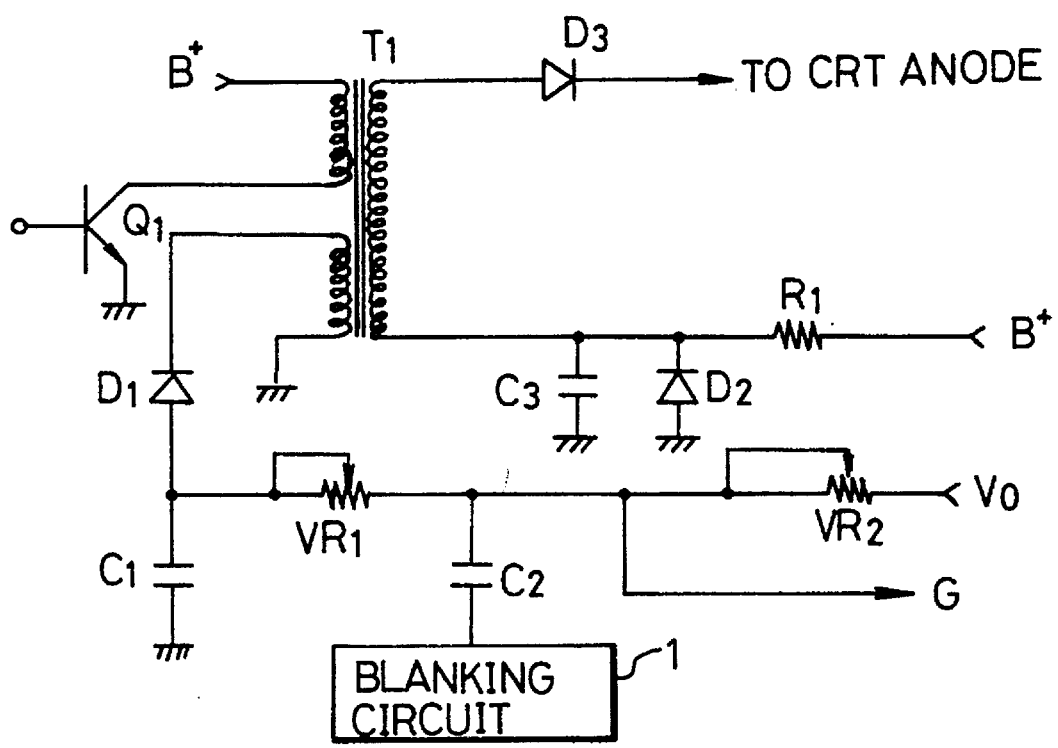
FIG. 1 is a schematic circuit diagram of a conventional brightness control apparatus.
Figure 2:
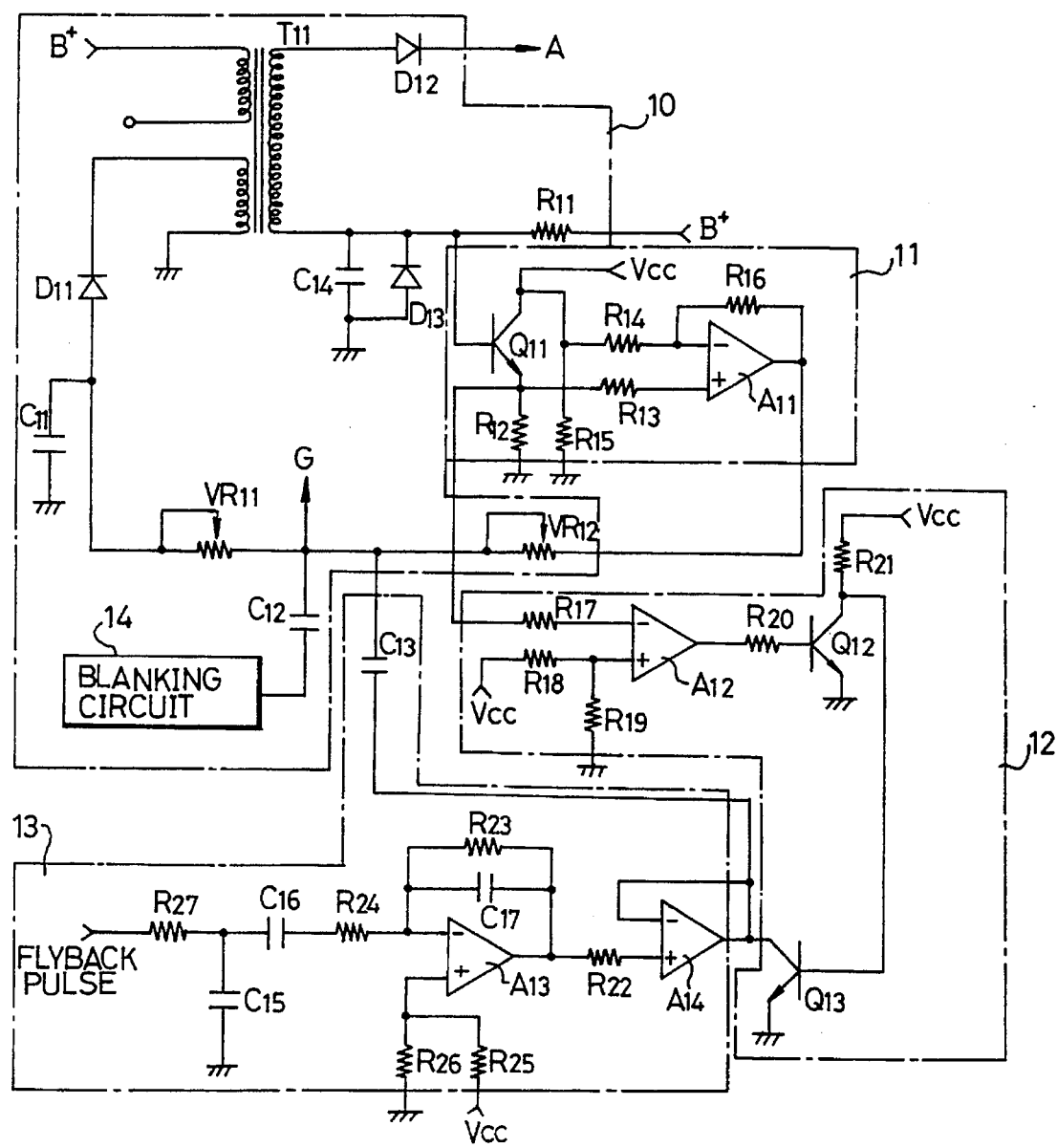
FIG. 2 is a schematic circuit diagram of a brightness control apparatus according to the present invention.

FIG. 2 is a schematic circuit diagram of a brightness control apparatus according to the present invention. Referring to FIG. 2, the present brightness control apparatus comprises a brightness control section 10 for controlling the brightness of the monitor, a beam current detecting section 11 for detecting the beam current flowing to an anode A of the CRT to provide the detected beam current to the brightness control section 10 and a control section 12, the control section 12 for controlling the operation of a brightness control voltage output section 13 in accordance with the beam current detected by the beam current detecting section 11, and the brightness control voltage output section 13 for outputting a brightness control voltage to the brightness control section 10 under the control of the control section 12.

The brightness control section 10 is provided with a flyback transformer 11 for generating high voltage pulses to provide the high voltage pulses to the anode A of the CRT, a diode D11 for passing negative-going portions of pulses induced in a secondary winding of the flyback transformer 11 for generating a CRT grid voltage, a capacitor C11 for smoothing the voltage provided from the diode D11, a first variable resistor VR11 for adjusting the smoothed DC voltage to provide the adjusted DC voltage to a grid terminal G of the CRT, a second variable resistor VR12 for adjusting a voltage provided from an amplifier A11 in the beam current detecting section 11 to provide the adjusted voltage to the grid terminal G of the CRT, and a blanking circuit section 14 for providing blanking pulses to the grid terminal G of the CRT.

The beam current detecting section 11 is provided with a transistor Q11 for detecting the beam current flowing through the flyback transformer T11, and the amplifier A11 for amplifying the detected beam current to provide the amplified beam current to the second variable resistor VR12 in the brightness control section 10.

The control section 12 is provided with a comparator A12 for comparing the beam current detected by the transistor Q11 with a predetermined current value, a transistor Q12 which performs switching operation in accordance with the output (i.e., a high or low level signal) of the comparator A12, and a transistor Q13 which is turned on or off according to the switching operation of the transistor Q12 to control the brightness control voltage output section 13.

The brightness control voltage output section 13 is provided with a resistor R27 and a capacitor C15 which constitute an integrator loop for integrating input flyback pulses, an integrator A13, composed of resistors R23 and R24 and a capacitor C17, for integrating the output signal of the integrator loop, and an amplifier A14 for amplifying the output signal of the integrator A13 and providing the amplified signal to the brightness control section 10 in accordance with a control signal outputted from the transistor Q13 in the control section 12.

In FIG. 2, the numerals C12 to C14, C16 and C17 denote capacitors, R11 to R26 denote resistors, and D12 and D13 denote diodes.

The operation of the present brightness control apparatus as constructed above will now be explained with reference to FIGS. 2 and 3.

If the B$^+$ supply voltage is applied to a primary winding of the flyback transformer T11 a high voltage is induced in one secondary winding of the flyback transformer T11 for generating the CRT anode voltage, and the induced high voltage is supplied to the anode of the CRT.

At the same time, the voltage induced in the other secondary winding of the flyback transformer T11 for generating the CRT grid voltage is supplied to the diode D11. The diode D11 passes and provides to the capacitor C11 only negative-going portions of the input voltage. The capacitor C11 smooths the negative-going voltage portions provided from the diode D11 and provides the smoothed DC voltage to the first variable resistor VR11. The negative DC voltage through the first variable resistor VR11 is then supplied to the grid terminal G of the CRT. The first variable resistor VR11 is for adjusting the level of the DC voltage smoothed by the capacitor C11 to provide the adjusted voltage to the grid terminal of the CRT.

The blanking circuit section 14 generates and outputs the blanking pulses to the grid terminal G of the CRT through the capacitor C12. The blanking pulses are for blanking the retrace lines appearing on the screen during the retrace periods.

At this time, the transistor Q11 in the beam current detecting section 11 detects the beam current flowing through the resistor R11 in the brightness control section 10 and provides the detected beam current to the amplifier A11 and the comparator A12 in the control section 12. The amplifier A11 amplifies the current signal outputted from the transistor Q11 with an amplification factor determined by the resistors R14 to R15 and provides the amplified signal to the second variable resistor VR12 in the brightness control section 10. The second variable resistor VR12 varies the voltage outputted from the amplifier A11 in the beam current detecting section 11 and outputs the amplified voltage to the grid terminal G of the CRT to control the back raster. It is to be noted that according to the conventional brightness control apparatus, the voltage being supplied to the second variable resistor VR12 is a fixed voltage.

Meanwhile, the resistor R27 and the capacitor C15 in the brightness control voltage output section 13 integrates the input flyback pulses as shown in FIG. 3A and outputs a sawtooth wave as shown in FIG. 3B to the integrator A13 through the capacitor C16. The integrator A13 integrates the sawtooth wave with the help of the resistors R23 and R24 and the capacitor C17 and provides a parabolic signal as shown in FIG. 3C to the amplifier A14. The amplifier A14 amplifies the parabolic signal and provides the amplified parabolic signal to the grid terminal G of the CRT through the capacitor C13 under the control of the control section 12.

The comparator A12 in the control section 12 compares the beam current detected by the transistor Q11 in the beam current detecting section 11 with a reference value determined by the resistors R18 and R19. If the beam current value is higher than the reference value, the comparator A12 outputs a high level signal to the transistor Q12, while it outputs a low level signal if the beam current value is lower than the reference value.

The transistor Q12 turns off the transistor Q13 by the high level output of the comparator Q12, while it turns on the transistor Q13 by the low level output of the comparator A12. If the transistor Q13 is turned on, the voltage outputted from the amplifier A14 in the brightness control voltage output section 13 is bypassed to ground through the on-stated transistor Q13, preventing the parabolic signal outputted from the amplifier A14 from being supplied to the brightness control section 10. If the transistor Q13 is turned off, the voltage outputted from the amplifier A14 is supplied to the brightness control section 10 through the capacitor C13, resulting in that the brightness of the center portion of the monitor is kept same as that of the circumferential portion thereof.

Specifically, in case that the brightness of the picture is increased due to the increase of the beam current flowing to the CRT, the voltage drop through the resistor R11 increases and this causes the voltage value supplied to the transistor Q11 in the beam current detecting section 11 to decrease. Accordingly, the output value of the amplifier A11 decreases and thus the voltage level inputted to the grid terminal G of the CRT is lowered, causing the back raster to become darker.

In this case, though the voltage drop occurs through the resistor R11, the voltage value outputted through the transistor Q11 becomes greater than the reference value determinedly the resistors R18 and R19 connected to the comparator A12 in the control section 12, and the comparator A12 outputs a high level signal. This causes the transistor Q12 to be turned on and the transistor Q13 to be turned off, and thus the brightness control voltage outputted from the amplifier A14 in the brightness control voltage output section 13 is supplied to the grid terminal G of the CRT. As a result, the back raster becomes darker as well as the brightness of the CRT's center portion is kept same as that of the CRT's circumferential portion. FIG. 3E shows the waveform of the brightness control voltage in this case.

Meanwhile, in case that the picture is darkened due to the decrease of the beam current flowing to the CRT, the voltage drop through the resistor R11 decreases and this causes the voltage value supplied to the transistor Q11 to increase. Accordingly, the output value of the amplifier A11 increases and thus the voltage level inputted to the grid terminal G of the CRT is heightened, causing the back raster to become brighter.

In this case, though the voltage drop through the resistor R11 decreases and the voltage value outputted through the transistor Q11 increases, it is still lesser than the reference voltage value determined by the resistors R18 and R19 connected to the comparator A12, and thus the comparator A12 output a low level signal. This causes the transistor Q12 to be turned off and the transistor Q13 to be turned on, and thus the brightness control voltage outputted from the amplifier A14 in the brightness control voltage output -section 13 is bypassed to ground. Accordingly, supply of the brightness control voltage to the grid terminal G of the CRT is prevented, resulting in that the brightness of the back raster becomes greater. FIG. 3D shows the waveform of the brightness control voltage in this case.

As described above, according to the present invention, the voltage being supplied to the second variable resistor VR12 is adjusted according to the anode voltage being supplied to the CRT, and thus the voltage of the back raster can be automatically controlled corresponding to the present picture state.

While the present invention has been described and illustrated herein with reference to the preferred embodiment thereof, it will be understood by those skilled in art that various changes in form and details may be made therein without departing from the spirit and scope of the invention.

What is claimed is:

1. An automatic brightness control apparatus for a monitor having an anode and a grid terminal, the apparatus comprising:

means for controlling brightness of said monitor;

means for detecting a beam current flowing to said anode;

control means for controlling a brightness control voltage being supplied to said grid terminal in accordance with said beam current detected by said beam current detecting means, said control means comprising a comparator which compares said beam current detected by a first transistor in said beam current detecting means with a predetermined reference value and providing a high or low level signal according to the result of the comparison;

a second transistor which performs a switching operation in accordance with an output of said comparator; and a third transistor having an on or off state controlled by the switching operation of said second transistor; and means for providing said brightness control voltage to said brightness control means under the control of said control means, said brightness control voltage providing means coupled to said third transistor of said control means, so that in one of the on or off states of said third transistor, the brightness control voltage is transmitted to said brightness control means while in the other of the on or off states, the brightness control voltage is not transmitted to said brightness control means.

2. An automatic brightness control apparatus as claimed in claim 1, wherein said brightness control means comprises:

a flyback transformer for generating and providing to said anode high voltage pulses;

a diode for passing only negative-going portions of pulses induced in a secondary winding of said flyback transformer;

a capacitor for smoothing said negative-going pulses provided from said diode;

a first variable resistor for adjusting a smoothed voltage from said capacitor and providing the adjusted voltage to said grid terminal;

a second variable resistor for adjusting a voltage provided from said beam current detecting means and providing the adjusted voltage to said grid terminal; and a blanking circuit for generating and providing to said grid terminal blanking pulses for blanking retrace lines appearing on a screen during retrace periods.

3. An automatic brightness control apparatus as claimed in claim 1, wherein said beam current detecting means comprises:

a fourth transistor for detecting said beam current flowing through said brightness control means; and an amplifier for amplifying said beam current detected by said fourth transistor and providing the amplified beam current to said brightness control means.

4. An automatic brightness control apparatus as claimed in claim 1, wherein said brightness control voltage providing means comprises:

an integrator for integrating input flyback pulses; and an amplifier for amplifying an output signal of said integrator and providing the amplified signal to said brightness control means in accordance with a control signal provided from in said control means.

* * * * *

UNITED STATES PATENT AND TRADEMARK OFFICE
CERTIFICATE OF CORRECTION

PATENT NO. : 5,596,375
DATED : January 21, 1997
INVENTOR(S) : Gi J. Kwon

It is certified that error appears in the above-indentified patent and that said Letters Patent is hereby corrected as shown below:

Col. 1, line 11, after "raster" insert --in--.

Col. 4, line 67, Col. 5, line 1 "determinedly" should be --determined by--.

Signed and Sealed this

Seventh Day of July, 1998

*Attest:*

BRUCE LEHMAN

*Attesting Officer*     Commissioner of Patents and Trademarks